2,744,092
Patented May 1, 1956

2,744,092

LINEAR POLYESTERS FROM p,p'-SULFONYL DIBENZOIC ACID PLUS ALIPHATIC DIBASIC BRANCHED-CHAIN ACIDS CONDENSED WITH A GLYCOL

John R. Caldwell, Kingsport, Tenn., assignor to Eastman Kodak Company, Rochester, N. Y., a corporation of New Jersey No Drawing. Application October 3, 1952,
Serial No. 313,064

23 Claims. (Cl. 260—75)

This application relates to valuable linear polyesters prepared by condensing a p,p'-sulfonyl dibenzoic acid diester in conjunction with an aliphatic branched-chain dibasic acid diester containing at least 4 carbon atoms with a polymethylene glycol and/or an aliphatic ether glycol.

It is an object of this invention to provide novel interpolyesters as described herein. It is another object to provide a process as described herein for preparing valuable interpolyesters. Other objects will become apparent hereinafter.

This application is a continuation-in-part of my copending application, Serial No. 143,594, filed February 10, 1950, now U. S. Patent No. 2,614,120, dated October 14, 1952. In that application sulfonyl dibenzoic acid is called bis (dicarboxydiphenylsulfone).

Highly polymeric esters of terephthalic acid and various glycols, for example, ethylene glycol, trimethylene glycol, hexmethylene glycol, etc., are well known, and have been used in the preparation of linear, highly polymeric polyesters having properties including that of being capable of being formed into useful filaments, fibers and the like, and having high melting points and a low degree of solubility in organic solvents. Linear polyesters prepared from other aromatic dicarboxylic acids have also been described in the prior art and contemporary art.

Interpolyesters of terephthalic acid and other dibasic acids condensed with dihydroxy compounds have also been described.

None of the polyesters known in the prior art are easily prepared without high cost. Moreover, they do not possess the herein-described highly advantageous properties which render them especially suitable for processing by injection molding and extrusion methods. Furthermore, the known polyesters do not possess the low modulus of elasticity resulting in high resiliency and reversible extensibility possessed by the interpolyesters described herein.

It has now been found that p,p'-sulfonyl dibenzoic acid or its esters or its acid chloride plus an aliphatic branched-chain dibasic acid or diester thereof can be condensed with a polymethylene glycol and/or an aliphatic ether glycol to produce a new kind of linear interpolyester having highly valuable properties which are superior to those of the linear polyesters described in the prior art. Thus, my new interpolyesters can be prepared having a relatively wide softening range and good flow characteristics whereby they are quite valuable for the production of shaped objects by injection molding or extrusion method. These novel interpolyesters can be prepared so as to soften at temperatures which are above about 180° C. Useful interpolyesters can also be prepared which soften at lower temperatures.

The novel interpolyesters described herein are quite useful in the making of electrical insulation.

These novel interpolyesters can be prepared so as to have especially valuable properties when formed into fibers by melt spinning methods followed by drawing. These fibers can be prepared so as to have a reversible extensibility of about 30% or more.

The modulus of elasticity of these interpolyesters is unusually low compared to known polyesters; accordingly, these interpolyesters are quite rubbery and resilient. They are highly valuable where a high degree of elastic recovery is desirable, e. g., gaskets, packing, resilient elastic fibers, flexible tubing, elastic clothing, etc. Although interpolyesters can be prepared which soften at 180°–200° C. or higher, many valuable products can be produced which soften at lower tempratures.

My novel interpolyesters may contain as constituents thereof small percentages of the m,m' and/or the m,p' isomers of the p,p'-sulfonyl dibenzoic compound without significant deleterious effect on the properties of these interpolyesters. In fact, when the interpolyester is to be employed for purposes other than for making fibers, substantial quantities of these isomers can be employed with some advantageous results, especially as regards increasing the softening temperature range.

Two of the outstanding qualities of the interpolyesters of this invention are their excellent dimensional stability and low degree of water absorptivity. This results in superior resistance to dimensional change despite changes in atmospheric humidity or immersion in aqueous solutions.

The interpolyesters of this invention have melting points which are up to as much as or more than 50° C. higher than corresponding interpolyesters prepared from dibasic acidic compound combinations described in the prior art. This characteristic results in a much greater effective range of utility for these new interpolyesters, for instance, gaskets can be prepared for employment in equipment operating at higher temperatures, fibers can be made which withstand higher ironing temperatures when fabrics are prepared from yarns incorporating these fibers, etc.

One embodiment of this invention relates to a process for preparing an interpolyester comprising (A) condensing about 10 mole proportions of a sulfonyl dibenzoic compound having the formula:

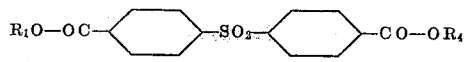

wherein $R_1$ and $R_4$ each represent a substituent selected from the group consisting of a β-hydroxyalkyl radical containing from 2 to 4 carbon atoms, an omega-hydroxyalkyl radical containing from 3 to 12 carbon atoms and an alkyl radical containing from 1 to 6 carbon atoms, plus from about 1 to about 30 mole proportions of a branched-chain aliphatic acid diester selected from those having the following formula:

$$R_8O—OC—R_{10}—CO—OR_9$$

wherein $R_{10}$ represents a divalent radical selected from the group consisting of an ethylidene radical and a branched-chain alkylene radical containing from 3 to 12 carbon atoms, and $R_8$ and $R_9$ each represents a substituent selected from the group consisting of an omega-hydroxyalkyl radical containing from 2 to 12 carbon atoms and an alkyl radical containing from 1 to 6 carbon atoms, (B) with a dioxy compound selected from the group consisting of those compounds having the following formulas:

and

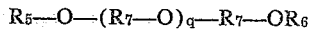

wherein $p$ represents a positive integer of from 2 to 12, $R_5$ and $R_6$ each represents a substituent selected from the group consisting of a hydrogen atom and an acyl radical containing from 2 to 4 carbon atoms, $R_7$ represents an alkylene radical containing from 2 to 4 carbon atoms and $q$ represents a positive integer of from 1 to 10 inclusive, the dioxy compound being employed in such a proportion that there is at least an equivalent amount of oxy substituents in proportion to the carbalkoxy substituents in the overall combination of the diesters and the dioxy compounds, (C) in the presence of a condensing agent selected from the group consisting of the alkali metals, the alkaline earth metals, the oxides of these two groups of metals, the alkoxides containing from 1 to 6 carbon atoms of these two groups of metals, the carbonates and borates of these two groups of metals, lead oxide, and compounds having the following formulas:

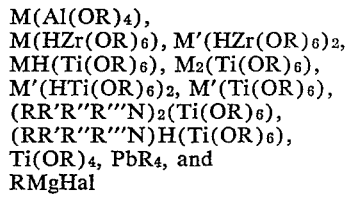

wherein M represents an alkali metal, M' represents an alkaline earth metal selected from the group consisting of magnesium, calcium and strontium, R represents an alkyl group containing from 1 to 6 carbon atoms, R', R" and R''' each represents a member of the group consisting of R and an aryl group of the benzene series containing from 6 to 9 carbon atoms and Hal represents a halogen atom, (D) at an elevated temperature, (E) the condensation being conducted in an inert atmosphere, and (F) the latter part of the condensation being conducted at a very low pressure of the inert atmosphere.

Advantageously, the dioxy compound is employed in such a proportion that there are from about 1.2 to about 3 oxy substituents in proportion to the carbalkoxy substituents in the overall combination of the diesters and the dioxy compounds. Advantageously, the low pressure defined under (F) is less than about 15 mm. of Hg pressure. Advantageously, the elevated temperature employed during the earlier part of the condensation is from about 150° to about 220° C. Advantageously, the dioxy compound is a glycol having the formula:

wherein $p$ is defined under (B) above.

The dioxy compounds defined above may not actually contain any free hydroxy radicals since they may be in esterified form as indicated by the formulas given. However, these hydroxy or substituted hydroxy radicals are referred to generically as oxy radicals or substituents. The dioxy compounds which can be employed in accordance with this invention are most advantageously dihydroxy compounds; such compounds will hereinafter be referred to as dihydroxy compounds although it is to be understood that dioxy compounds of the type described above are intended to be covered by this term. Each diester is considered as containing two carbalkoxy radicals as that term is employed in the definition of the process as described above since $R_1$ and $R_4$ may be alkyl radicals, omega hydroxyalkyl radicals or β-hydroxyalkyl radicals and $R_8$ and $R_9$ may be alkyl radicals or omega hydroxyalkyl radicals. Even when the process is preceded by the preliminary step described below employing free acids, the term carbalkoxy radicals in the description of the process is intended to encompass such free carboxy radicals.

Furthermore, this invention covers a process as defined above wherein either or both of the sulfonyl dibenzoic acid diester and the aliphatic acid diester is/are formed by a preliminary step comprising condensing free p,p'-sulfonyl dibenzoic and/or free aliphatic acid with a dihydroxy compound which is defined under (B) and is employed in the proportions set forth under (B), at an elevated temperature, after which preliminary step the condensing agent which is defined under (C) is added and the condensation is completed as defined under (D), (E) and (F). Advantageously the elevated temperature employed during the preliminary step is substantially that at which reflux conditions subsist; however, higher and lower temperatures can also be employed. Advantageously, as indicated above the dihydroxy compound is employed in such a proportion that there are from about 1.2 to about 3 hydroxy substituents in proportion to the carboxy and carbalkoxy substituents in the overall combination of the diacids, diesters, and dihydroxy compounds.

As indicated above, the interpolyesters described herein have relatively wide softening ranges and good flow properties. In this respect, they differ from most types of high-melting linear polyesters, such as polyethylene terephthalate, which possesses sharp melting points. Thus, these modified polyesters of sulfonyl dibenzoic acid soften over a sufficiently wide temperature range that they can be advantageously employed in the production of shaped objects by injection molding and extrusion methods.

The alkylene glycols which can be employed to form highly polymeric linear polyesters are straight-chain alkane diols, viz. polymethylene glycols, wherein the hydroxy radicals are positioned at the two ends of the alkylene chain. Examples of such glycols include ethylene glycol, 1,3-propylene glycol, 1,4-butylene glycol, 1,6-hexylene glycol, 1,10-decamethylene glycol, 1,12-dodecamethylene glycol, etc. As indicated above, mono or diesters of these glycols can also be employed. Thus, the acetates, propionates and butyrates are examples of such esters. The defined ether glycols can be employed either in lieu of the polymethylene glycols or in conjunction therewith as modifiers. Mixtures of alkylene glycols or ether glycols can also be employed. Examples of ether glycols include diethylene glycol, triethylene glycol, tetraethylene glycol, bis (4-hydroxybutyl) ether, bis (3-hydroxypropyl) ether, etc. When mixtures of alkylene glycols and ether glycols are employed, it is generally preferable to employ a major proportion of the alkylene glycol in order to obtain higher melting linear polyesters. The high melting characteristic also is dependent upon the amount of branched-chain aliphatic dibasic acid present in the interpolyester, the chain length of this aliphatic acid and the chain length of the glycol employed. Higher proportions of the aliphatic acid lower the melting and softening temperatures of the interpolyesters. This effect is also produced when a longer chain-length aliphatic acid is employed in the same proportions as a shorter chain length acid. Moreover, this effect is also dependent upon the manner in which the branching in the aliphatic chain takes place. The same effect is created by employing a longer chain (higher carbon content) alkylene glycol. For example, when a 10-12 carbon atom glycol is employed, the amount of aliphatic ether glycol used should preferably be not more than about 10-20 mole per cent; whereas, when a 2-4 carbon atom glycol is employed the amount of ether glycol can be as high as about 50 mole per cent of the total quantity of dihydroxy compounds employed. When no ether glycol is employed, it is preferred to employ polymethylene glycols containing from 4 to 8 carbon atoms; this is especially important when the aliphatic acid has a rather short chain length, the proportion thereof is relatively low and the polymethylene glycol also has a short chain length (e. g. ethylene and trimethylene glycol) under which conditions the mole ratio of the p,p' sulfonyl dibenzoic ester to the aliphatic diester should be from 10:10 to 10:30 since the melting point of the interpolyester produced might otherwise be above 300° C. whereby decomposition would take place whenever the polyester was melted or softened.

Valuable fibers having high melting temperatures can be prepared by incorporating very little, preferably none, of an aliphatic ether glycol and less than 15 mole per cent of the aliphatic dibasic acid (of the type described above)

into an interpolyester containing about 85–90 mole per cent of the p,p'-sulfonyl dibenzoic constituent. It is particularly adgantageous to employ a polymethylene glycol containing from 5 to 8 carbon atoms and an aliphatic branched-chain acid diester containing from 4 to 10 carbon atoms in the acid portion of the diester when it is desired to obtain fibers having a pronounced degree of elastic extensibility. For general molding and extrusion purposes, glycols containing from 2 to 6 or 8 carbon atoms and the 4 to 10 carbon atom acid diesters are usually to be preferred. However, on the other hand, valuable interpolyesters can be prepared employing aliphatic ether glycols without any alkylene glycol although the product obtained will not be suitable for forming useful fibers.

The catalytic condensing agents which can be employed have been described above. From about 0.005% to about 0.2% of such catalysts based on the weight of the reactants being condensed can be employed. Higher or lower percentages can also be employed. Generally, from about 0.01% to about 0.06% of the catalytic condensing agent can be advantageously employed based on the weight of the various diesters being condensed.

The temperature at which polyesterification can be conducted is dependent upon the specific reactants involved in any given reaction. In general, the reaction mixture can be heated at from about 150° to about 220° C. for from approximately two to three hours in an inert atmosphere (e. g. nitrogen or hydrogen); the mixture can then be heated at from about 225°–240° to about 280°–310° C. in the same atmosphere for approximately 1 to 2 hours. Finally, the pressure can be greatly reduced to form a vacuum (less than about 15 mm. of Hg pressure but preferably on the order of less than 5 mm. of Hg pressure) while the temperature is maintained in the same range (225°–310° C.); these conditions are advantageously maintained for approximately 4 to 6 additional hours. This final phase is advantageously carried out with good agitation under the high vacuum in order to facilitate the escape of volatile products from the highly viscous melt. The conditions can be varied considerably depending upon the degree of polyesterification desired, the ultimate properties sought, the stability of the polyester being produced, and the use for which the product is intended. Thus, the extent of the substitution of the sulfonyl dibenzoic diesters with the esters of additional modifying acid necessitates variations in these conditions of temperature, pressure and time periods required. The employment of the novel catalytic condensing agents listed hereinabove results in better products being prepared in much less time than is possible when the catalysts of the prior art are employed.

It has been found that the type of catalyst used has an important bearing upon the properties of the final product. Although most of the catalysts cited in the prior art may be used, it has been found that certain novel catalysts give superior results. The aluminum and titanium alkoxide complexes described in copending applications filed on even date herewith are especially valuable for the preparation of the polyesters described here. Moreover, novel tin catalysts have also been found to be especially effective. See Caldwell Serial No. 313,072, Serial No. 313,078, Caldwell and Reynolds Serial No. 313,077, Wellman and Caldwell Serial No. 313,074, Serial No. 313,075 and Serial No. 313,076, and Wellman Serial No. 313,073 for a description of especially advantageous catalytic condensing agents.

The reaction can be carried out in the presence or absence of a solvent. Inert, high boiling compounds, such as diphenyl ether, diphenyl, mixed tolyl sulfones, chlorinated naphthalene, chlorinated diphenyl, dimethyl sulfolane, etc., can be used as the reaction medium.

It is important to exclude oxygen and moisture at all stages of the condensation reaction. Inert atmospheres which can be advantageously employed include nitrogen, hydrogen, helium, etc. Substantially anhydrous reactants can also be advantageously employed although this is not essential, especially if any water is removed in the earlier stages of the condensation.

As indicated above, the acidic constituents of the interpolyesters are employed in the form of their diesters. The omega-hydroxyalkyl diesters can be prepared as described above by heating a polymethylene glycol (or an aliphatic ether glycol) with the free acid, preferably employing an excess of the glycol. The beta-hydroxyalkyl diesters can be prepared as described in my parent application employing an alkylene oxide. The acid chlorides can be employed in some cases although the conditions involved are generally substantially different.

Examples of the various diesters which can be employed in accordance with the process of this invention include the ethyl, propyl, n-butyl, sec-butyl, isopropyl, sec-amyl, n-hexyl, 10-hydroxydecyl, 5-hydroxyamyl, 12-hydroxydodecyl, 2-hydroxyethyl, etc. diesters of either p,p'-sulfonyl dibenzoic acid or any of the aliphatic branched-chain dibasic acids of the type described above. When the novel catalytic condensing agents described hereinabove and in copending applications referred to herein are employed, the simple alkyl esters of these various dibasic acids can be advantageously employed, whereas if the catalysts known to the prior art are employed, the condensation will not proceed as rapidly or as effectively although satisfactory results can be obtained.

The aliphatic branched-chain dibasic acids encompassed within the scope of this invention contain from 1 to 8 carbon atoms in a straight chain between the carboxyl groups and have one or more alkyl substituents attached to this chain. The attached alkyl substituents can contain from 1 to 4 or more carbon atoms and can also be branched. The alkyl group is advantageously a methyl, ethyl, propyl or butyl radical although isopropyl, sec-butyl and other alkyl radicals can also be present. Two of the substituent alkyl radicals can be attached to the same carbon atom when they are methyl or ethyl groups. Examples of suitable acids include: dimethyl malonic, methyl succinic, $\alpha,\alpha$-dimethyl succinic, $\alpha,\beta$-dimethyl succinic, ethyl succinic, butyl succinic, $\beta$-methyl glutaric, $\alpha,\beta$-dimethyl glutaric, $\beta$-methyl adipic, $\beta$-propyl adipic, $\gamma$-ethyl pimelic, and $\beta$-methyl sebacic, etc. In general, the position of the alkyl group has little or no influence on the utility of the acid, although it may have some effect on the properties of the polyester, e. g. the melting point.

The advantageous ratio of p,p'-sulfonyldibenzoic diester to the modifying aliphatic dibasic acid diester will depend upon the type of product desired. As the mole percent of the modifying acid in the polyester is increased, the melting point of the product is lowered. When short chain glycols such as ethylene glycol and tetramethylene glycol are used, it is usually preferable to employ from 1 to 3 moles of the modifying acid diester for each mole of p,p'-sulfonyldibenzoic diester in order to keep the melting point of the product below its decomposition temperature. When higher glycols such as pentamethylene, hexamethylene, and octamethylene glycol are used, from about 1 to about 7 or 8 moles of the aliphatic branched-chain dibasic acid diester can be employed for each ten moles of p,p'-sulfonyl dibenzoic acid.

As indicated hereinabove, some of the isomers of p,p'-sulfonyl dibenzoic acid can be employed under some circumstances with resultant lowering of the melting or softening temperatures but with a probable increase in the softening range of temperatures. The same effect is produced when homologs of p,p'-sulfonyl dibenzoic acid are incorporated into the materials being condensed to prepare these interpolyesters. If homologs are employed they are most advantageously those of p,p'-sulfonyl dibenzoic acid, e. g. m,m'-dimethyl-p,p'-sulfonyl dibenzoic acid, o-ethyl-p,p'-sulfonyl dibenzoic acid, m-methyl-o-propyl-p,p'-sulfonyl dibenzoic acid, etc.

Small proportions of various diesters of such isomers and homologs can be employed in substitution for a corresponding quantity of the diester of p,p'-sulfonyl dibenzoic acid when the interpolyester product is not intended to be used in the preparation of fibers.

The products of this invention are linear interpolyesters which possess favorable flow characteristics over a temperature differential or range of about 5° to 20° C., a low modulus of elasticity and which contain in the interpolyester configuration a ratio of about 10 of one of the following repeating units:

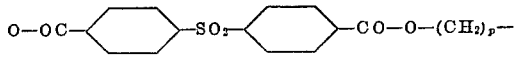

to each 1 to about 30 of one of the following repeating units:

$$O-OC-R_{10}-CO-O-(CH_2)_p-$$

wherein $R_{10}$ and $p$ are defined above.

When the ratio of the repeating units is, respectively, from about 10:1 to about 10:2 these interpolyesters are capable of being spun into fibers which can be drawn to from about 3 to 6 times their originally spun length thereby developing strong, elastic properties distinguished by a high degree of reversible extensibility.

The above described interpolyesters can also have either one or both of the two types of repeating units depicted above replaced by entirely or in part, respectively, one of the following repeating units:

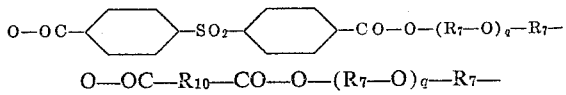

$$O-OC-R_{10}-CO-O-(R_7-O)_q-R_7-$$

wherein $R_{10}$ and $q$ are defined above.

In the examples given below, the hot bar sticking temperature is referred to in several instances. The hot bar sticking test can be briefly described as follows: A polyester fiber is placed on the flat surface of a heated bar and a weight of 100 grams is applied to the fiber along a distance of ⅝ inch of the fiber length. The contact surface of this weight has a coating of polytetrafluoroethylene which acts as a thermal insulator. The fiber is allowed to remain in contact with the bar under this weight for one minute. The minimum temperature at which the fiber adheres to the hot bar under these conditions is the sticking temperature as that term is employed in the examples given herein.

This invention can be further illustrated by the following examples; in addition to these examples it is apparent that other variations and modifications thereof can be adapted to obtain similar results:

*Example 1.—α,α-Dimethyl glutaric acid and tetramethylene glycol*

Four hundred and twenty grams (1.0 mol) of p,p'-sulfonyldibenzoic acid dibutyl ester, 190 grams (1.0 mol) of α,α-dimethyl glutaric acid dimethyl ester, and 360 g. (4.0 mol) tetramethylene glycol were placed in a reaction vessel equipped with a stirrer, a short distillation column, and an inlet for purified hydrogen. Ten cc. of butyl alcohol containing 0.25 g. sodium titanium butoxide was added as a catalyst and the mixture was heated at 200–210° C. with stirring. After one or two hours, the evolution of butyl and methyl alcohols had practically ceased, showing that the ester interchange was complete. The temperature was then raised to 260–270° and held for 20–30 minutes. A vacuum of 0.5 to 1.0 mm. of Hg pressure was then applied while the heating and stirring were continued for 2½ to 3 hours. A colorless product was obtained having an inherent viscosity of 0.7 to 0.8 in 60% phenol-40% tetrachlorethane solution. This interpolyester begins to flow under pressure at about 180° C. and gradually becomes softer as the temperature is raised. It does not have a sharp melting point. Because of its relatively wide softening range, the interpolyester is especially suitable for injection molding or extrusion. It can also be converted into films or sheets by extrusion through suitable dies. Films or fibers that have been oriented by drafting and then heat treated show a hot bar sticking temperature of 200°–210° C. The polyester is soluble in hot gamma-butyrolactone, phenol, and tetrachlorethane. Molded or extruded objects made from the interpolyester tend to be somewhat flexible and rubbery; i. e., this product has a pronounced degree of reversible extensibility.

*Example 2.—α,α-Dimethyl glutaric acid and ethylene glycol*

Four hundred and twenty grams (1.0 mol) p,p'-sulfonyldibenzoic acid dibutyl ester, 300 g. (1.6 mol) α,α-dimethyl glutaric acid dimethyl ester, and 360 g. ethylene glycol were placed in a reaction vessel equipped with a stirrer, a short distillation column, and an inlet for purified nitrogen. A solution of 0.3 g. sodium titanium butoxide in 10 cc. butyl alcohol was added as a catalyst. The mixture was stirred at 180–190° C. in a stream of nitrogen. A mixture of butyl and methyl alcohols distilled off. The ester interchange was essentially complete in 2 hours. The temperature was then raised to 270–275° C. and held for 30 minutes. A vacuum of 1.0 to 2.0 mm. of Hg pressure was then applied, while stirring was continued for 1 to 1½ hours. The product obtained has an inherent viscosity of 0.6 to 0.70 in 60% phenol-40% tetrachlorethane. The interpolyester tends to be more hard and rigid than the one described in Example 1 where tetramethylene glycol was used. This product shows good flow characteristics when molded by injection methods. Films can be cast from tetrachlorethane solutions. They can be used as photographic film base materials.

*Example 3.—Dimethyl malonic acid and pentamethylene glycol*

Three hundred and seventy-two grams (1.0 mol) of p,p'-sulfonyldibenzoic acid diethyl ester, 95 g. (0.5 mol) dimethylmalonic acid diethyl ester, and 300 g. pentamethylene glycol were placed in a reaction vessel as described in Example 1. A solution of 0.2 g. of sodium aluminum ethoxide in ethyl alcohol was added as a catalyst. The mixture was heated and stirred at 200–210° C. in a stream of pure nitrogen for 2 hours to remove ethyl alcohol. The temperature was then raised to 250° C. and held for 30 minutes. A vacuum of 2.0 to 3.0 mm. of Hg pressure was then applied for 2 hours. The product obtained had a softening point of about 200° C. After it has been oriented and heat treated, it sticks to the hot bar at 180–190° C. This interpolyester can be molded and extruded to give products that show good impact properties. It is useful as a photographic film base and as an electrical insulation.

*Example 4.—β-Methyl adipic acid and hexamethylene glycol*

A polyester product having the composition: 0.75 mol p,p'-sulfonyldibenzoic acid+0.25 mol β-methyl adipic acid+1.0 mol hexamethylene glycol was prepared by reacting these gram mole quantities of the two acid ethyl diesters with 2 gram moles of the glycol in exactly the same manner as described in Example 1. The product obtained was a polyester similar to the interpolyester produced as described in Example 1 except that it had a lower softening and hot bar sticking temperature. It is useful as a plastic for injection molding.

*Example 5.—γ-Ethyl glutaric acid and pentamethylene glycol*

A polyester having the composition: 0.80 mol p,p'-sulfonyldibenzoic acid+0.20 mol γ-ethyl glutaric acid+1.0 mole pentamethylene glycol was made by reacting these gram mole quantities of the two acid ethyl diesters with 2 gram moles of pentamethylene glycol in exactly the same manner as described in Example 1. The product obtained was an interpolyester similar in most respects to those described by Example 1 and by Example 5; the properties were more or less intermediate between those of these examples. The product obtained can be fabricated by extrusion and by injection molding processes.

*Example 6.—α,β-Dimethyl succinic acid and octamethylene glycol*

A polyester having the composition: 0.60 mole p,p'-sulfonyldibenzoic acid+0.40 mole α,β-dimethyl succinic acid+1.0 mole octamethylene glycol was prepared by reacting these gram mole quantities of the two acid ethyl diesters with 2 moles of octamethylene glycol in exactly the same manner as described in Example 1. The product obtained was an interpolyester similar to that described in Examples 1 and 5 except for a lower softening and hot bar sticking temperature; however, this interpolyester is useful in manufacturing shaped objects by extrusion methods and can also be employed for other purposes.

*Example 7.—Dimethyl malonic acid, ethylene glycol and diethylene glycol*

1.75 gram moles of p,p'-sulfonyl dibenzoic acid diethyl ester (650 grams), 0.25 gram mole of dimethylmalonic acid diethyl ester (48 grams), 1.5 gram moles of ethylene glycol and 1.5 gram moles of diethylene glycol were placed in a reaction vessel as described in Example 1. A solution of 1.0 gram of sodium aluminum ethoxide in ethyl alcohol was added as the catalyst. The mixture was heated and stirred at 190°–200° C. in a stream of pure nitrogen for 3 hours to remove ethyl alcohol. The temperature was then raised to 245° C. and held for 50 minutes. The pressure was then reduced to 0.5–1.0 mm. of Hg pressure for 6 hours. The product obtained had a softening point of about 180° C. This interpolyester can be molded and extruded to give products having good reversible extensibility.

*Example 8.—Dimethyl malonic acid, ethylene glycol and diethylene glycol*

The procedure described in Example 7 was repeated exactly except that 1.5 grams of Sr(OC₂H₅)₂ dissolved in ethyl alcohol was employed as the catalyst. A product was obtained which was practically identical to the interpolyester produced in Example 7. Similar results can be obtained using as the catalyst K, Ca, Li₂CO₃, PbO (litharge), etc. Such catalysts can also be employed in the processes described in the other examples after making suitable allowances for the differences in the reaction rates inherent in the change of the catalyst.

In the description herein-above and in the claims the term "branched-chain alkylene radical" clearly is intended to cover divalent alkylene radicals which include the following examples: 1,3-butylene and 2,5-hexylene, which radicals have the formulas:

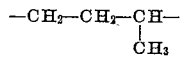

and

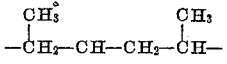

What I claim is:

1. A process for preparing a linear polyester comprising (A) condensing about 10 mole proportions of a p,p'-sulfonyl dibenzoic diester having the formula:

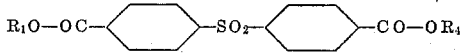

wherein R₁ and R₄ each represents a substituent selected from the group consisting of a β-hydroxyalkyl radical containing from 2 to 4 carbon atoms, an omega-hydroxyalkyl radical containing from 3 to 12 carbon atoms and an alkyl radical containing from 1 to 6 carbon atoms, plus from about 1 to about 30 mole proportions of an aliphatic diester selected from those having the following formula:

wherein R₁₀ represents a divalent radical selected from the group consisting of an ethylidene radical and a branched-chain alkylene radical containing from 3 to 12 carbon atoms, and R₈ and R₉ each represents a substituent selected from the group consisting of an omega-hydroxyalkyl radical containing from 2 to 12 carbon atoms and an alkyl radical containing from 1 to 6 carbon atoms, (B) with a dioxy compound selected from the group consisting of those compounds having the following formulas:

and

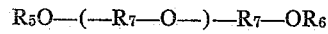

wherein p represents a positive integer of from 2 to 12, R₅ and R₆ each represents a substituent selected from the group consisting of a hydrogen atom and an acyl radical containing from 2 to 4 carbon atoms, R₇ represents an alkylene radical containing from 2 to 4 carbon atoms and q represents a positive integer of from 1 to 10 inclusive, the dioxy compound being employed in such a proportion that there is at least an equivalent amount of oxy substituents in proportion to the carbalkoxy substituents in the overall combination of the diesters and the dioxy compound, (C) in the presence of a condensing agent selected from the group consisting of the alkali metals, the alkaline earth metals, the oxides of these two groups of metals, the alkoxides containing from 1 to 6 carbon atoms of these two groups of metals, the carbonates and borates of these two groups of metals and lead oxide, (D) at an elevated temperature, (E) the condensation being conducted in an inert atmosphere, and (F) the latter part of the condensation being conducted at a very low pressure of the inert atmosphere, said process encompassing the condensation of only those compounds referred to in (A) and (B) hereinabove.

2. A process as defined in claim 1 wherein the elevated temperature is increased gradually during the course of the condensation up to a temperature of from about 225° to about 310° C.

3. A process as defined in claim 2 wherein the condensing agent is employed in an amount of from about 0.005% to about 0.2% based on the weight of the diesters employed.

4. A process as defined in claim 3 wherein the dioxy compound is employed in such a proportion that there are from about 1.2 to about 3 oxy substituents in proportion to the carbalkoxy substituents in the overall combination of the diesters and the dioxy compounds.

5. A process as defined in claim 4 wherein the elevated temperature employed during the earlier part of the condensation is from about 150° to about 220° C. and the low pressure defined under (F) is less than about 15 mm. of Hg pressure.

6. A process as defined in claim 5 wherein all materials employed in the process are substantially anhydrous.

7. A process as defined in claim 6 wherein the dioxy compound has the formula:

wherein p is defined under (B).

8. A process as defined in claim 7 wherein the aliphatic diester is dimethyl α,α-dimethylglutarate and the dihydroxy compound is tetramethylene glycol.

9. A process as defined in claim 7 wherein the aliphatic diester is dimethyl α,α-dimethylglutarate and the dihydroxy compound is ethylene glycol.

10. A process as defined in claim 7 wherein the aliphatic diester is diethyl dimethylmalonate and the dihydroxy compound is pentamethylene glycol.

11. A process as defined in claim 7 wherein the aliphatic diester is diethyl γ-ethylglutarate and the dihydroxy compound is pentamethylene glycol.

12. A process as defined in claim 6 wherein the aliphatic diester is dimethyl dimethylmalonate and the dihydroxy compound is made up of an equimolecular mixture of ethylene glycol and diethylene glycol.

13. A process as defined in claim 1 wherein the sulfonyl dibenzoic diester is formed by a preliminary step comprising condensing p,p'-sulfonyl dibenzoic acid with a dioxy compound which is defined under (B) and is employed in such a proportion that there is at least an equivalent amount of oxy substitutents in proportion to the carboxy substitutents in the over-all combination of the dibenzoic acid and the dioxy compound, at an elevated temperature, after which preliminary step the condensing agent which is defined under (C) is added and the condensation is completed as defined under (D), (E) and (F).

14. A process as defined in claim 13 wherein the preliminary elevated temperature is substantially that at which reflux conditions subsist, the subsequent condensation being conducted at a temperature which is gradually increased during the course of the condensation up to about 280°–310° C. and the dioxy compound is employed in such a proportion that there are from about 1.2 to about 3 oxy substituents in proportion to the carboxy and carbalkoxy substituents in the overall combination of the diacids, diesters and dioxy compounds.

15. A process as defined in claim 1 wherein the aliphatic diester is formed by a preliminary step comprising condensing an aliphatic acid selected from the group having the following formula:

$$HO-OC-R_{10}-CO-OH$$

wherein $R_{10}$ represents a divalent radical selected from the group consisting of an ethylidene radical and a branched-chain alkylene radical containing from 3 to 12 carbon atoms, with a dioxy compound which is defined under (B) and is employed in such a proportion that there is at least an equivalent amount of oxy substitutents in proportion to the carboxy substitutents in the over-all combination of the dibenzoic acid and the dioxy compound, at an elevated temperature, after which preliminary step the condensing agent which is defined under (C) is added and the condensation is completed as defined under (D), (E) and (F).

16. A process as defined in claim 15 wherein the preliminary elevated temperature is substantially that at which reflux conditions subsist, the subsequent condensation being conducted at a temperature which is gradually increased during the course of the condensation up to about 280–310° C., and the dioxy compound is employed in such a proportion that there are from about 1.2 to about 3 oxy substituents in proportion to the carboxy and carbalkoxy substituents in the overall combination of the diacids, diesters and dioxy compounds.

17. A process as defined in claim 16 wherein the condensing agent is employed in an amount of from about 0.005% to about 0.2% based on the weight of the diesters being condensed, the elevated temperature employed during the earlier part of the condensation to form the interpolyester is from about 150° C. to about 220° C. and the low pressure defined under (F) is less than about 15 mm. of Hg pressure.

18. A linear interpolyester having a softening temperature differential of from about 5° to 20° C. consisting of a ratio of about 10 of one of the following repeating units:

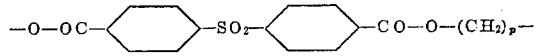

to each 1 to about 30 of one of the following repeating units:

$$-O-OC-R_{10}-CO-O-(CH_2)_p-$$

wherein $R_{10}$ represents a divalent radical selected from the group consisting of an ethylidene radical and a branched-chain alkylene radical containing from 3 to 12 carbon atoms, and $p$ represents a positive integer of from 2 to 12, which interpolyester has a low modulus of elasticity and is capable of being readily formed into shaped objects within its softening range and wherein the $-(CH_2)_p-$ units in the molecular structure include a substantial proportion of such units wherein $p$ is at least 4.

19. A linear interpolyester as defined in claim 18 wherein at least one of the repeating units depicted therein is replaced by the following repeating unit corresponding thereto:

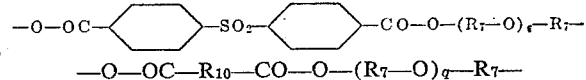

$$-O-OC-R_{10}-CO-O-(R_7-O)_q-R_7-$$

wherein $R_{10}$ represents a divalent radical selected from the group consisting of an ethylidine radical and a branched-chain alkylene radical containing from 3 to 12 carbon atoms, $R_7$ represents an alkylene radical containing from 2 to 4 carbon atoms and $q$ represents a positive integer of from 1 to 10.

20. A linear interpolyester as defined in claim 18 wherein $p$ is 4 and $R_{10}$ is a 1,1-dimethyl-1,3-propylene radical.

21. A linear interpolyester as defined in claim 18 wherein $p$ is 2 and $R_{10}$ is a 1,1-dimethyl-1,3-propylene radical.

22. A linear interpolyester as defined in claim 18 wherein $p$ is 5 and $R_{10}$ is a dimethyl-methylene radical.

23. A linear interpolyester as defined in claim 18 wherein $p$ is 5 and $R_{10}$ is a 1-ethyl-1,3 propylene radical.

References Cited in the file of this patent

UNITED STATES PATENTS

| | | |
|---|---|---|
| 2,437,046 | Rothrock et al. | Mar. 2, 1948 |
| 2,465,319 | Whinfield et al. | Mar. 22, 1949 |
| 2,547,113 | Drewitt et al. | Apr. 3, 1951 |
| 2,623,033 | Snyder | Dec. 23, 1952 |

FOREIGN PATENTS

| | | |
|---|---|---|
| 621,997 | Great Britain | Apr. 25, 1949 |